United States Patent
Ackermann et al.

(10) Patent No.: US 10,473,245 B2
(45) Date of Patent: Nov. 12, 2019

(54) LOCKING ELEMENT FOR A CONNECTOR

(71) Applicant: EUGEN FORSCHNER, Spaichingen (DE)

(72) Inventors: Janosch Ackermann, Spaichingen (DE); Sebastian Grunefeld, Spaichingen (DE); Mario Linz, Spaichingen (DE)

(73) Assignee: EUGEN FORSCHNER GMBH (DE)

( * ) Notice: Subject to any disclaimer, the term of this patent is extended or adjusted under 35 U.S.C. 154(b) by 236 days.

(21) Appl. No.: 15/510,571

(22) PCT Filed: Sep. 14, 2015

(86) PCT No.: PCT/EP2015/070990
§ 371 (c)(1),
(2) Date: Mar. 10, 2017

(87) PCT Pub. No.: WO2016/038826
PCT Pub. Date: Mar. 17, 2016

(65) Prior Publication Data
US 2017/0284581 A1    Oct. 5, 2017

(30) Foreign Application Priority Data
Sep. 12, 2014    (DE) .................. 10 2014 113 151

(51) Int. Cl.
*F16L 37/084*    (2006.01)

(52) U.S. Cl.
CPC ................ *F16L 37/0841* (2013.01)

(58) Field of Classification Search
CPC ..................... F16L 37/0841; F16L 37/086

USPC .................................. 285/308, 319
See application file for complete search history.

(56) References Cited

U.S. PATENT DOCUMENTS

| | | | | |
|---|---|---|---|---|
| 1,203,630 A | * | 11/1916 | Koenig | F16L 37/0841 |
| | | | | 285/317 |
| 3,711,125 A | * | 1/1973 | Dehar | F16L 37/0985 |
| | | | | 285/319 |
| 3,929,356 A | * | 12/1975 | DeVincent | F16L 37/0841 |
| | | | | 285/124.5 |
| 4,436,125 A | * | 3/1984 | Blenkush | F16L 37/0841 |
| | | | | 137/797 |
| 4,541,457 A | * | 9/1985 | Blenkush | F16L 37/0841 |
| | | | | 137/614.05 |
| 4,863,201 A | * | 9/1989 | Carstens | F16L 37/0841 |
| | | | | 285/317 |

(Continued)

FOREIGN PATENT DOCUMENTS

| | | | | |
|---|---|---|---|---|
| FR | | 3004506 A1 * | 10/2014 | F16L 37/0841 |
| WO | WO-2016038226 A1 * | | 3/2016 | F16L 37/0841 |

*Primary Examiner* — David Bochna
(74) *Attorney, Agent, or Firm* — Greg M. Popowitz; Assouline & Berlowe, P.A.

(57) ABSTRACT

A locking element for detachably fixing a fluid-carrying plug to a connector, including, a locking element having at least one spring element, by means of which the locking element is moved automatically into a locking position with the connector as the plug is inserted, and held in its locking position, wherein the locking element has a limb that is moved at right angles to an axis of the connector, in which limb there is formed a bore for the plug to be led through; and characterized in that the locking element consists of a spring steel and the spring element is formed in one piece therewith.

12 Claims, 4 Drawing Sheets

(56) References Cited

U.S. PATENT DOCUMENTS

| | | | | |
|---|---|---|---|---|
| 5,052,725 A * | 10/1991 | Meyer | .................. | F16L 37/0841 |
| | | | | 285/308 |
| 5,104,158 A * | 4/1992 | Meyer | .................. | F16L 37/0841 |
| | | | | 285/308 |
| 5,845,943 A * | 12/1998 | Ramacier, Jr. | ...... | F16L 37/0841 |
| | | | | 285/12 |
| 6,231,089 B1 * | 5/2001 | DeCler | ............... | F16L 37/0841 |
| | | | | 285/308 |
| 6,340,180 B1 * | 1/2002 | Wisniewski | .......... | F16L 37/084 |
| | | | | 285/319 |
| 7,434,842 B2 * | 10/2008 | Schmidt | .............. | F16L 37/0841 |
| | | | | 285/308 |
| 7,757,704 B2 * | 7/2010 | Lien | .................... | F16L 37/0841 |
| | | | | 137/269.5 |
| 8,087,451 B2 * | 1/2012 | Gammons | ........... | F16L 37/0841 |
| | | | | 165/46 |
| 2013/0300108 A1 * | 11/2013 | Frick | .................. | F16L 37/0841 |
| | | | | 285/319 |

* cited by examiner

LOCKING ELEMENT FOR A CONNECTOR

The invention relates to a locking element for a connector, as is used to connect plugs and hose couplings, according to the preamble of patent claim 1. The invention also relates to a locking system according to claim 9.

A generic locking element is known, for example, from DE 10 2004 054 467 A1. After the plug has been inserted into the connector, the fork-like locking element is pushed into the connector at right angles to the axis of the plug, latches there in a sprung manner behind a bead of the connector and, as a result, holds the latter firmly in the connector by a form fit. The known locking element must be moved manually into its coupling position, at the same time the plug is pressed against its stop in the connector.

The object of the invention is to provide a locking element and a locking system with easier handling and increased locking security.

This object is achieved by a locking element having the features of claim 1 and a locking system having the features of claim 9. Advantageous refinements of the invention are specified in the dependent claims.

The locking element according to the invention has at least one spring element or is connected to or engages with such an element, by means of which the locking element is moved automatically into a locking position with the plug and held in its locking position. The spring element in the invention thus causes automatic movement of the locking element into its locking position as the plug is inserted. The spring element is formed either as an integral component of the locking element or as an additional element arranged on or fixed to the latter. For example, as spring tongues made of spring steel, which can be connected non-detachably or detachably to a locking element made of plastic by means of partial embedding or insertion.

According to an advantageous design or an alternative of the invention, provision is made for the locking element to have a limb which is moved at right angles to an axis of the connector, in which limb therein is formed by a bore for the plug to be led through. The fact that the plug is surrounded by a closed bore of the locking element means that reliable fixing of the plug in the connector is ensured. Known locking elements, by contrast, are generally formed by a plastic clamp that is open at the bottom, which provides lower security against breakage and inadvertent detachment.

According to a further advantageous refinement of the invention, provision is made for at least one first latching element, which at least in some phases is in engagement with a second latching element on the connector, to be formed on the limb. The first and second latching elements, in interaction, ensure exact positioning of the locking element as the plug is inserted or as the latter is uncoupled.

A further advantageous development of the invention provides for the locking element to have at least one resilient projection, by means of which it is forced into a defined axial position with respect to the connector. By means of the resilient projection, the axial play needed for the movement of the locking element is eliminated. In interaction with correspondingly configured guides on the aperture in the connector, the projection simultaneously effects centering of the locking element in the connector. In addition, this at least one resilient projection can either be formed integrated with the material of the locking element or arranged on the latter as a separate component.

The locking element according to the invention is preferably at least partly formed from a sheet metal or a spring steel, which provides high temperature resistance. The fact that the spring element is at least substantially formed from metal ensures permanent positioning of the plug in the connector even in the event of high temperature loading or loading by intense shaking.

In addition, the locking element according to the invention preferably has at least one further spring element or is connected to or engages with such an element, by means of which the plug is spring pre-loaded with respect to the connector in the axial direction counter to the insertion direction of the plug. As a result, the housing of the connector, preferably made of plastic, is effectively protected against bursting in the event of ice pressure arising if the medium falls below the freezing point and correspondingly expands, since in this case the plug can be displaced in a position counter to the pressure of the further spring element in the connector.

An advantageous locking system, the component of which forms the locking element described above, further provides for the plug to have at least one collar on the outer circumference, by means of which an actuating element for the second latching element on the locking element is actuated. The latching element on the locking element is formed as a latching hook or as a latching recess. The latching element on the connector is preferably formed by a latching projection that is complementary thereto.

The locking system further advantageously provides for at least one inclined surface formed on a vertical aperture of the connector or on the latching projection, by means of which inclined surface the latching hook is guided into engagement with a latching projection on the connector as the fixing is released.

In the following text, exemplary embodiments of the locking element and locking system according to the invention will be explained in more detail with reference to the drawings, in which:

FIG. 2 shows the locking system with plug partly pushed in;

Figure 1:
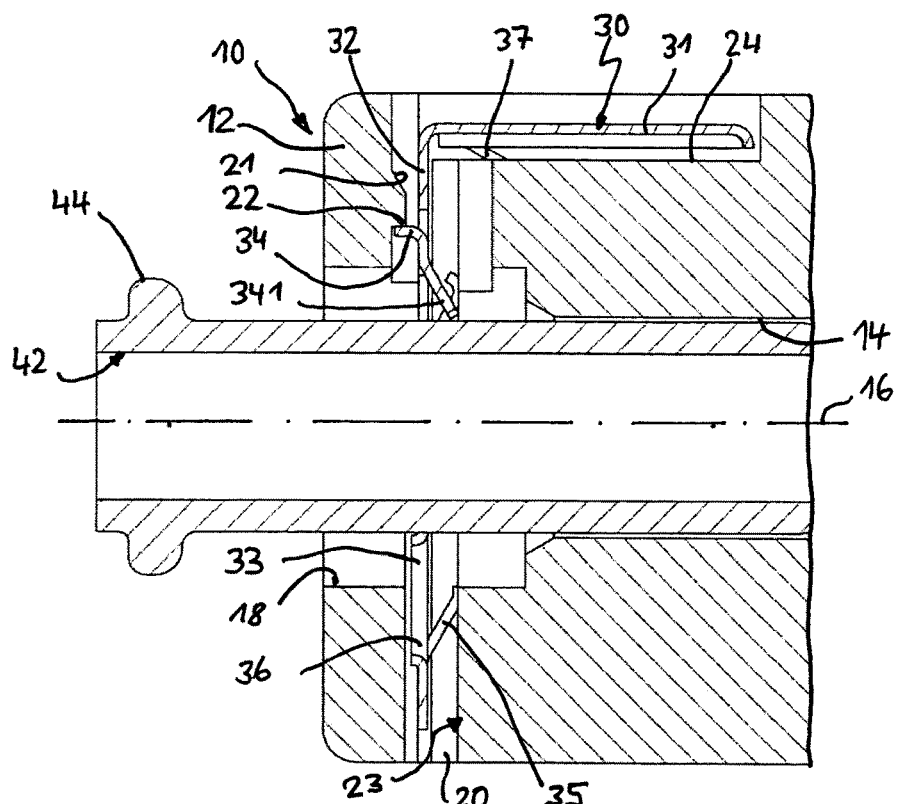
FIG. 1 shows the locking system with the locking element in the ready position before the insertion of the plug into the connector.

A first exemplary embodiment of the invention, illustrated in FIGS. 1 to 5, shows a connector 10 having a housing 12 which is penetrated by a horizontal bore 14. In the left-hand part of the housing 12, the bore 14 is widened by a receptacle 18 of greater diameter. The longitudinal axis 16 of the bore 14 simultaneously forms the longitudinal axis of a plug 40 accommodated in the bore 14.

The plug 40 is provided with a bore 42 running longitudinally and works in interaction with the bore of the connector 10 and a fluid line, not illustrated but connected to the connector 10 on the right-hand side in the drawing, for carrying a fluid. The shape of the plug 40 corresponds to a standardized SAE plug, as is used to connect a line carrying a urea mixture in diesel engines constructed in accordance with the new EU anti-pollution regulations.

The housing 12 also has an aperture 20 extending at right angles to the bore 14, which aperture is used to receive and guide a locking element 30. Provided on the left-hand wall of the aperture 20 is an inclined surface 21 protruding inward, which is adjoined at the bottom by a second latching element 22 protruding outward. Inclined surface 21 and latching projection interact with a latching hook on the locking element 30. In a higher-level designation, which also relates to the components according to the alternative shown in FIG. 6, the latching projection is designated as second latching element 22, and the latching hook as first latching element 34.

Close to the upper side of the housing 12, a recess 24 is provided on the latter, which is used to receive a horizontal limb 31 of the locking element 30 and two spring elements 37 formed on the horizontal limb 31 or arranged thereto.

Formed on a vertical limb 32 of the locking element 30 is a circular aperture 33, the diameter of which is larger than a collar 44 provided on the outer circumference of the plug 40. In the lower part, the aperture 33 is adjoined by a semicircular widening 36 with a smaller diameter. Together, the aperture 33 and the widening 36 jointly form a keyhole-like opening.

A latching hook, or first latching element 34 is also formed on the vertical limb 32 of the locking element 30, on the upper edge of the aperture 33, as first latching element 34. On both sides of the first latching element 34, cuts 342 originating from the aperture 33 are provided in the vertical limb 32. The cuts 342 merge into a lever arm 341 in their extension downward toward the aperture 33. The lever arm 341 is connected materially integrally to the first latching element 34, so that during a movement of the lever arm 341, the latching hook serves as first latching element 34 is necessarily moved therewith.

In addition, on both sides of the aperture 33 and the widening 36, a total of four projections 35 are formed on the vertical limb 32 of the locking element 30, preferably being formed materially integrally by notching out and bending from the vertical limb 32. With their tongues supported in a sprung manner against the right-hand wall of the aperture 20, the projections 35 firstly effect the pressing of the locking element 30 against the left-hand wall of the aperture 20, by which means the axial play of the locking element 30 in the aperture 20 is substantially eliminated. The projections 35 can alternatively also be formed as separate spring tongues and connected to the locking element 30 detachably or non-detachably by a form or force fit.

Secondly, in interaction with guides 23 formed on the right-hand wall of the aperture 20, the projections 35 effect centering of the locking element 30 in the aperture 20.

The connector 10 and the plug 40 are preferably produced from a plastic material that is resistant to urea and to highly different temperatures. The locking element 30 particularly preferably consists of a spring steel material.

In the following text, by using FIGS. 1 to 4, a locking operation of the plug 40 in the connector 10 will be described. In FIG. 1, the locking element 30 is pushed into the aperture 20 of the housing 12. The latching hook, serving as first latching element 34, rests on the latching projection, serving as second latching element 22. In this receiving or coupling position, the aperture 33 is aligned with the receptacle 18, so that the plug 40 can be inserted easily into the bore 14. The aligned arrangement of the aperture 33 with the receptacle 18 is always ensured in an accurately defined manner determined by the system in the present invention, irrespective of a manual operating operation, and contributes to increased security and an ability to be handled more easily when coupling and uncoupling a plug 40.

Figure 2:
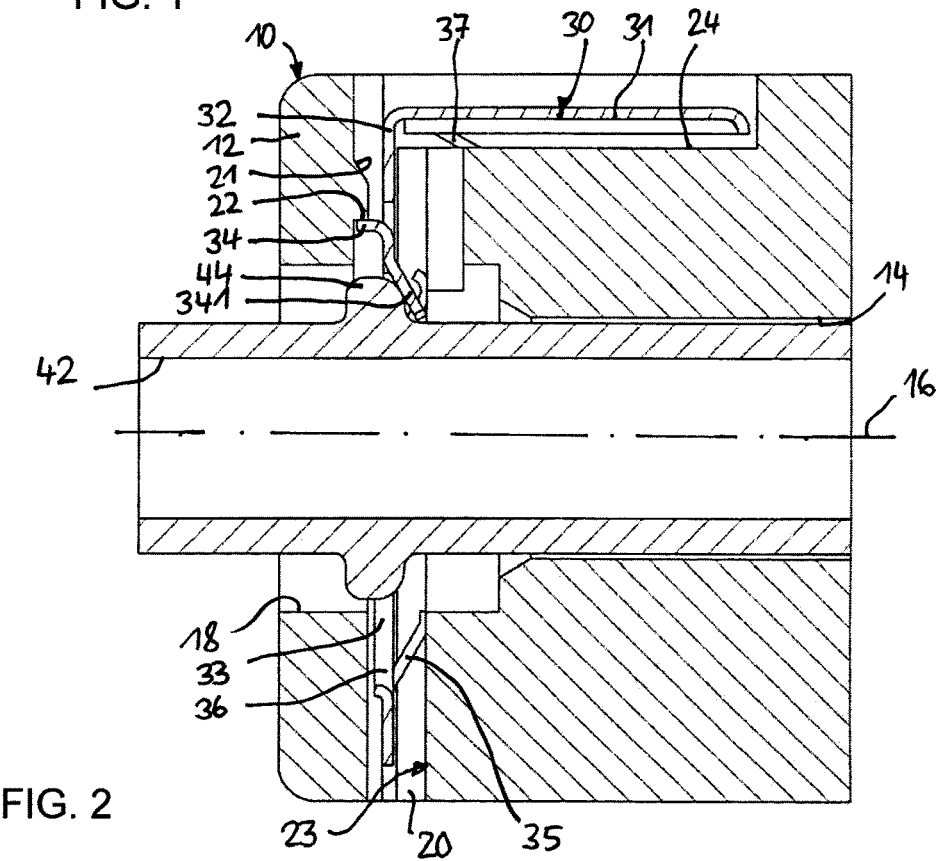

In FIG. 2, as the plug 40 is pushed further into the bore 14, the right-hand side of the collar 44 comes into contact with the lever arm 341.

Figure 3:
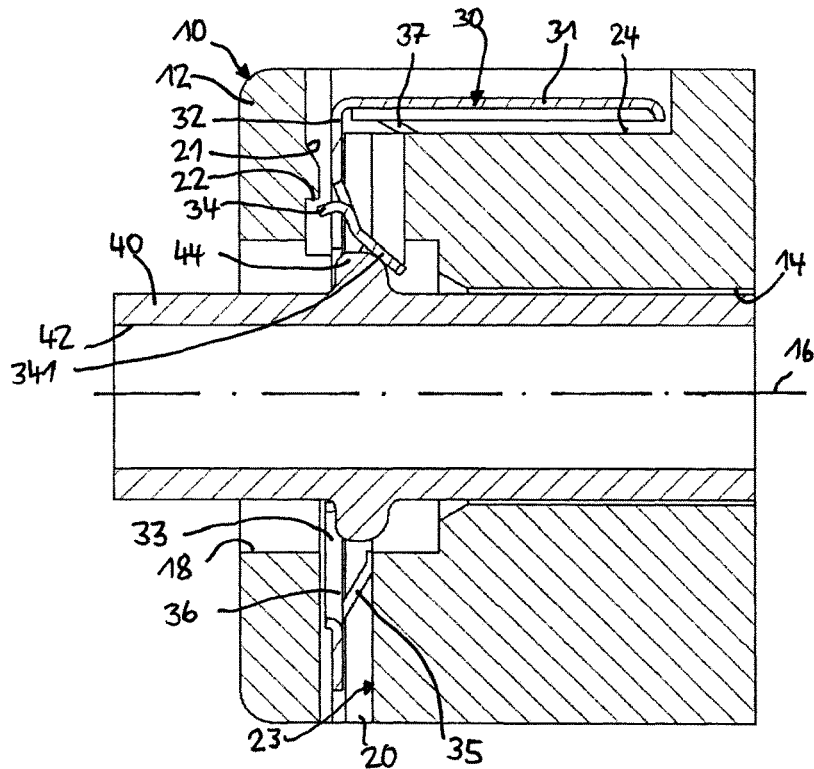
FIG. 3 shows the locking system when unlocking the latching hook.
Figure 4:
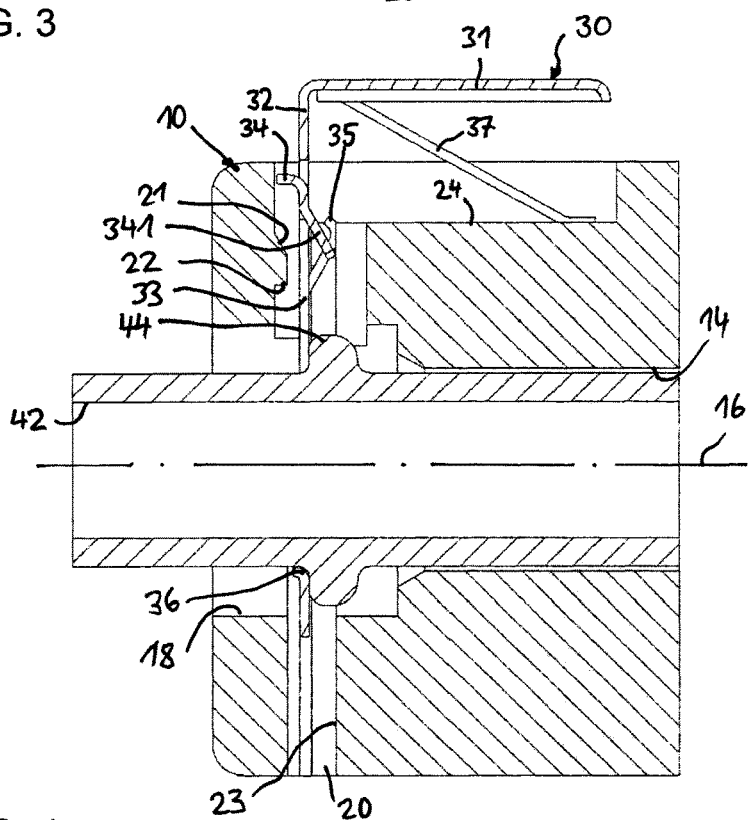
FIG. 4 shows the locking system in the locked position.
Figure 5:
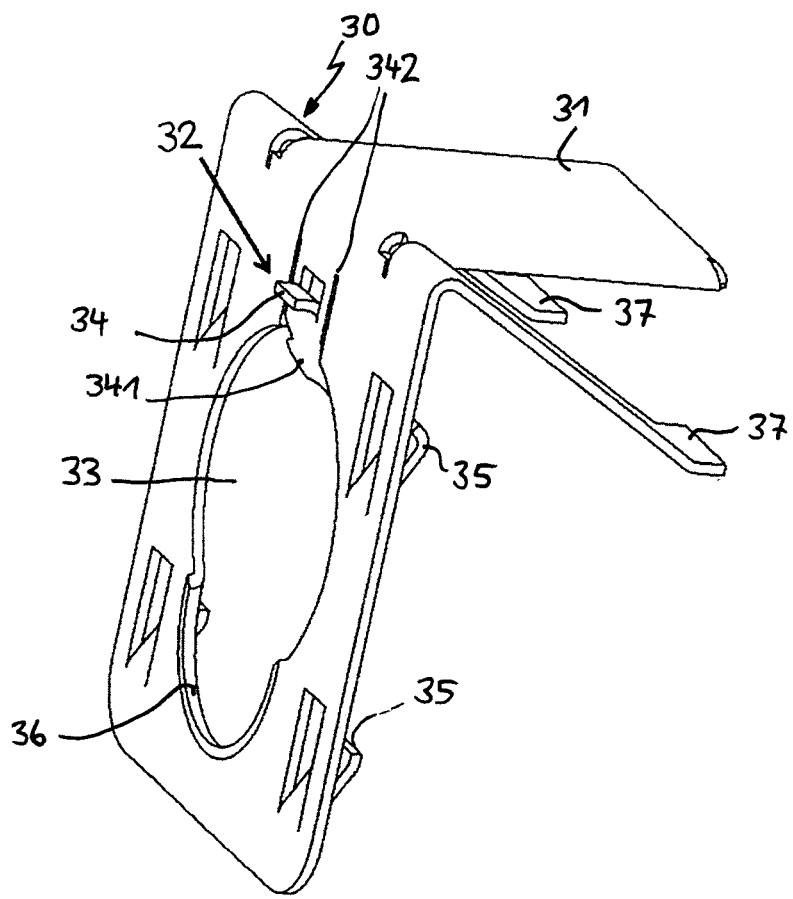
FIG. 5 shows an enlarged detail illustration of the locking element.

In FIG. 3, the collar 44 forces the lever arm 341 to the right. At the same time, the first latching element 34 is moved out of engagement with the second latching element 22. As a result of the spring pre-loading of the locking element 30 upward by means of the spring elements 37, after the collar 44 has forced the lever arm 341 to the side and the first latching element 34 has come out of engagement with the second latching element 22, the locking element 30 is automatically forced upward into the locking position. This locking position is illustrated in FIG. 4. In this position, the widening 36 rests from below on the outer side of the collar 44 and thus holds the plug 40 in a defined axial locking position with respect to the connector 10. The spring elements 37 are guided by the recess 24 on the housing 12.

To unlock, the locking element 30 is forced downward by its horizontal limb 31 out of the locking position illustrated in FIG. 4, counter to the spring force of the spring elements 37. The first latching element 34 slides downward over the inclined surface 21 and comes into engagement with the second latching element 22 again. Since, at the same time, the widening 36 is displaced downward and the aperture 33 comes into an aligned arrangement with respect to the receptacle 18, the plug 40 can again be pulled to the left out of the bore 14.

Figure 6:
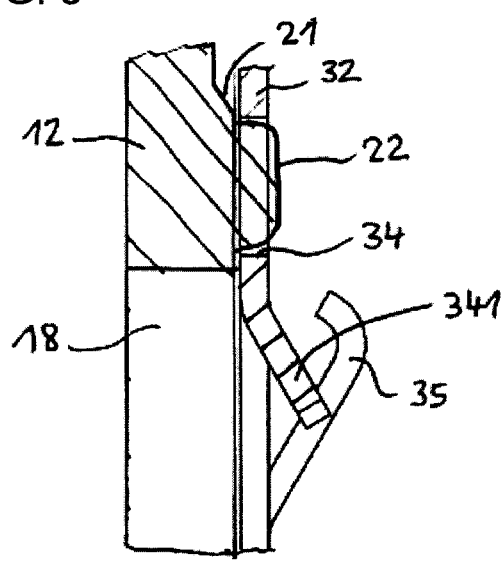
FIG. 6 shows an alternative embodiment of the latching elements.

An alternative configuration of the first and second latching element is shown in FIG. 6 as a second embodiment. Here, the first latching element 34 on the locking element 30 is formed by a latching recess 34. In a ready position for guiding a plug 40 in and out, corresponding to the position shown in FIG. 1, the latching recess 3401 engages around the latching projection 2201 on the left-hand wall of the housing 12 of the connector 10. To release the locking and to prepare for uncoupling the plug 40, as the locking element 30 is moved downward, the vertical limb 32 of the latter is guided into engagement with the latching projection 2201 again by the inclined surface 21, counter to the pressure of the projections 35.

According to a further variant, indicated in FIG. 8, the spring elements 37 can, for example, also be replaced by a spiral spring 37A, which is supported in the lower part of the housing 12 and which is forced from below against the lower edge of the vertical limb of the locking element 30. In this case, it is possible to dispense entirely with the horizontal limb 31 of the locking element 30 and, when unlocking the locking element 30, the operator simply presses on the upper edge of the vertical limb 32 which, for the purpose of protection against inadvertent detachment of the locking, even in the locked position, can be positioned in a recess 24 of the housing 12.

As a result of the engagement of the latching recess 3401 on the latching projection 22, the locking element 30 remains captively connected to the connector 10 and is ready for a renewed coupling operation of a plug 40. The coupling operation is simplified by the locking system according to the invention since, as the plug 40 is pushed in, the locking element 30 does not have to be moved manually but is moved automatically into the locking position by at least one pre-loaded spring element 37 or spiral spring 37A.

Figure 7:
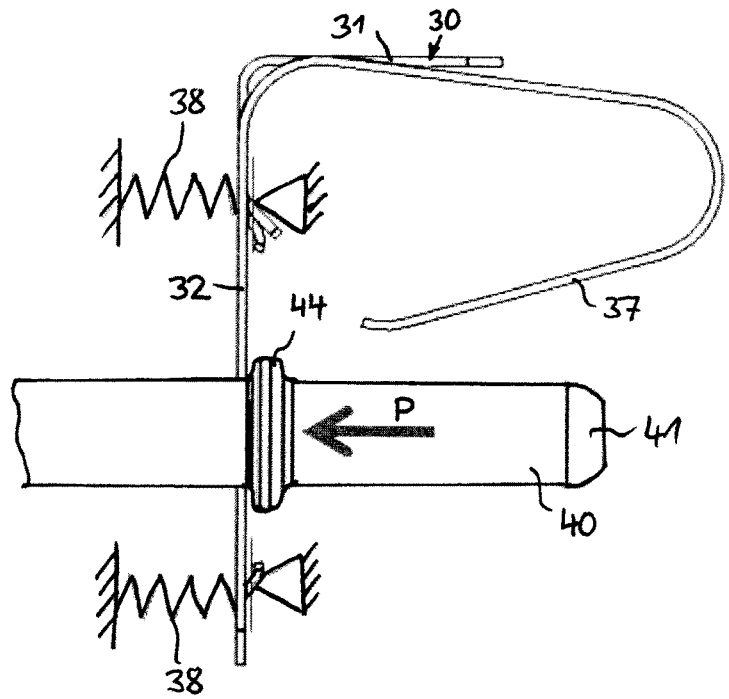
FIG. 7 shows a schematic illustration of an additional spring element for compensating for ice pressure acting on the plug.
Figure 8:
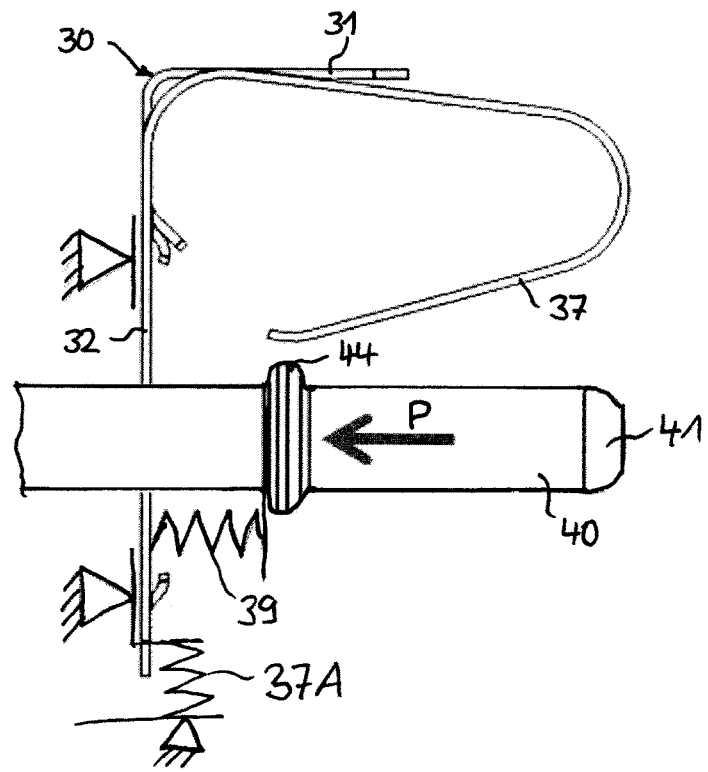
FIG. 8 shows an alternative configuration to FIG. 7.

As illustrated in FIG. 7 and FIG. 8, at least one further spring element 38 or 39 advantageously acts on the locking element 30, forcing the plug 40 in the axial direction against its seat on the connector 10. As a result, compensation is achieved of an ice pressure P acting on the front side 41 of the plug 40, which arises in the event of freezing of the liquid medium which is carried in the bore 42 and in a fluid line, not illustrated but tightly connected to the bore 14 and fixed to the connector 10, which liquid medium expands when reaching its freezing point.

The at least one spring element 38 formed as a compression spring according to FIG. 7 is arranged on the left of the vertical limb 32 such that it forces the collar 44 of the plug 40 to the right in FIG. 7 via the vertical limb 32 of the locking element 30. The spring force is designed to be higher than the plug-in force required for the insertion of the plug 40. However, it protects the housing 12 of the connector 10, consisting of plastic, effectively against bursting in the event of an ice pressure P arising as a result of falling below the freezing point of the medium.

In the variant illustrated in FIG. 8, the at least one spring element 38 is replaced by at least one spring element 39, which is arranged between the vertical limb 32 of the locking element 30 and the collar 44 of the plug 40 and produces a compressive force.

The at least one further first alternate spring element 38 or second alternate spring element 39 can particularly advantageously be formed directly on the locking element 30, for example in the form of a flare formed on the edge of the aperture 33 or as a separate component connected to or in engagement with the latter.

LIST OF DESIGNATIONS

10 Connector
12 Housing
14 Bore
16 Longitudinal axis
18 Receptacle
20 Aperture
21 Inclined surface
22 (Second) latching element
2201 latching projection
23 Guide
24 Recess
30 Locking element
31 (Horizontal) limb
32 (Vertical) limb
33 Aperture
34 (First) latching element
3401 latching recess
341 lever arm
342 Cut
35 Projection
36 Widening (of 33)
37 Spring element
37A spiral Spring
38 first alternate Spring element
39 second alternate Spring element
40 Plug
41 Front side (of 40)
42 Bore
44 Collar
P Ice pressure

The invention claimed is:

1. A locking system for detachably fixing a fluid-carrying plug to a connector, comprising:
   a locking element having at least one spring element, by means of which the locking element is moved automatically into a locking position with the connector as the plug is inserted, and held in its locking position;
   wherein the plug has at least one collar on the outer circumference, by means of which an actuating element for a first latching element on the locking element is actuated, by means of which the locking element is held in a defined coupling position for an insertion of the plug; and
   at least one inclined surface is formed on a vertical aperture of the connector, by means of which inclined surface the first latching element is guided into engagement with a second latching element on the connector as the locking is released.

2. The locking element as recited in claim 1, wherein the locking element is received and guided in a vertical aperture of the connector.

3. The locking element as recited in claim 1, wherein the plug is spring pre-loaded by at least one spring element with respect to the connector in the axial direction.

4. The locking element as recited in claim 1, wherein the at least one first latching element, that in some phases is engaged with the second latching element on the connector, is integrally formed on the locking element, the locking element consists of a spring steel and the spring element is formed in one piece therewith.

5. The locking element as recited in claim 1, wherein the locking element has at least one resilient projection or is connected to the at least one resilient projection, by means of which the locking element is forced into a defined axial position with respect to the connector.

6. The locking element as recited in claim 5, wherein the at least one resilient projection effects centering of the locking element in the connector.

7. A locking element for detachably fixing a fluid-carrying plug to a connector, comprising:
   a locking element having at least one spring element, by means of which the locking element is moved automatically into a locking position with the connector as the plug is inserted, and held in its locking position;
   wherein the locking element has a limb that is moved at right angles to an axis of the connector, in which limb there is formed a bore for the plug to be led through; and
   characterized in that the locking element consists of a spring steel and the spring element is formed in one piece therewith.

8. The locking element as recited in claim 7, wherein the plug is spring pre-loaded by at least one spring element with respect to the connector in the axial direction.

9. A locking system as recited in claim 7, wherein the plug has at least one collar on the outer circumference, by means of which an actuating element for a first latching element on the locking element is actuated, by means of which the locking element is held in a defined coupling position for an insertion of the plug.

10. The locking element as recited in claim 7, wherein the locking element has at least one resilient projection or is connected to the at least one resilient projection, by means of which the locking element is forced into a defined axial position with respect to the connector.

11. The locking element as recited in claim 10, wherein the at least one resilient projection effects centering of the locking element in the connector.

12. The locking element as recited in claim 7, wherein the locking element is received and guided in a vertical aperture of the connector.

* * * * *